(12) United States Patent
Southerland et al.

(10) Patent No.: US 6,332,207 B1
(45) Date of Patent: Dec. 18, 2001

(54) METHOD OF CORRECTING A READ ERROR IN A DISK DRIVE

(75) Inventors: Bobby Ray Southerland; Jin-Hong Hsueh; Lace J. Herman; John C. Purkett, all of Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/561,586

(22) Filed: Apr. 28, 2000

Related U.S. Application Data

(62) Division of application No. 09/382,715, filed on Aug. 24, 1999, now Pat. No. 6,147,827, which is a continuation of application No. 08/987,150, filed on Dec. 8, 1997, now Pat. No. 6,084,734.

(51) Int. Cl.[7] .......................... G11C 29/00; H03M 13/00
(52) U.S. Cl. ............................. 714/763; 714/758
(58) Field of Search .................... 714/746, 752, 714/758, 763, 774, 703; 341/91; 369/53.1

(56) References Cited

U.S. PATENT DOCUMENTS

| | | | |
|---|---|---|---|
| 4,975,915 | * 12/1990 | Sako et al. .......................... | 714/755 |
| 5,574,717 | * 11/1996 | Tomizawa et al. .................. | 370/244 |
| 5,835,507 | * 11/1998 | Huang et al. ........................ | 714/748 |
| 6,192,498 | * 2/2001 | Arato ................................... | 714/781 |

* cited by examiner

Primary Examiner—Christine T. Tu
(74) Attorney, Agent, or Firm—David M. Sigmond

(57) ABSTRACT

An apparatus for correcting read errors in a disk drive is disclosed. In one embodiment, the apparatus includes circuitry for determining that an undesired distortion exists in a data signal read from a surface of a data storage disk; circuitry for finding an approximate starting location of said distortion within said data signal; and, circuitry for correcting errors in said data signal caused by said undesired distortion using said approximate starting location of said distortion. A method for correcting read errors in a disk drive is also disclosed. In one embodiment, the method includes the steps of (1) providing an error correction code (ECC) that is capable of locating and correcting errors in a data signal; (2) determining that a data signal read from a surface of a data storage disk includes a distortion; (3) finding an approximate starting location of said distortion within said data signal; and, (4) performing error correction procedures on said data signal, based on said ECC, using said approximate starting location of said distortion

20 Claims, 15 Drawing Sheets

METHOD OF CORRECTING A READ ERROR IN A DISK DRIVE

CROSS-REFERENCE TO RELATED APPLICATIONS

This application is a divisional of U.S. application Ser. No. 09/382,715, filed Aug. 24, 1999, now is a U.S. Pat. No. 6,147,827, which is a continuation of U.S. application Ser. No. 08/987,150, filed Dec. 8, 1997, now is a U.S. Pat. No. 6,084,734

FIELD OF THE INVENTION

The invention relates generally to digital data storage systems and, more particularly, to recovery from data errors in such systems caused by undesired aberrations on a storage medium. The invention is particularly applicable in magnetic data storage systems.

BACKGROUND OF THE INVENTION

A disk drive is a digital data storage device that stores digital information within concentric tracks on a storage disk. In magnetic disk drive systems, the storage disk is coated with a magnetic material that is capable of changing its magnetic orientation in response to an applied magnetic field. During operation of a disk drive, the disk is rotated about a central axis at a substantially constant rate. To read data from or write to the disk, a magnetic transducer is centered above a desired track of the disk while the disk is spinning. Writing is performed by delivering a write signal having a variable current to the transducer while the transducer is held close to the spinning track. The write signal creates a variable magnetic field at a gap portion of the transducer that induces magnetic polarity transitions into the desired track which are representative of the data being stored.

Reading is performed by sensing the magnetic polarity transitions on the rotating track with the transducer. As the disk spins below the transducer, the magnetic polarity transitions on the track present a varying magnetic field to the transducer. The transducer converts the varying magnetic field into an analog read signal that is then delivered to a read channel for appropriate processing. The read channel converts the analog read signal into a properly timed digital signal that can be recognized by a host computer system.

The transducer can include a single element, such as an inductive read/write element, for use in both reading or writing or it can include separate read and write elements. Transducers that include separate elements for reading and writing are known as "dual element heads" and usually include a magnetoresistive (MR) read element for performing the read function. Dual element heads are advantageous because each element of the transducer can be optimized to perform its particular function. For example, MR read elements are more sensitive to small variable magnetic fields than are inductive heads and thus can read much fainter signals from the disk surface. MR elements, however, are not capable of writing to the disk surface. Because MR elements are more sensitive, data can be more densely packed on the surface of the disk with no loss of read performance.

MR read elements generally include a strip of magnetoresistive material that is held between two magnetic shields. The resistance of the magnetoresistive material varies almost linearly with an applied magnetic field. During a read operation, the MR strip is held near a desired track, within the varying magnetic field caused by the magnetic transitions on the track. A constant current is passed through the strip resulting in a variable voltage across the strip. By Ohm's law (i.e., V=I*R), the variable voltage is proportional to the varying resistance of the MR strip and hence is representative of the data stored within the desired track. The variable voltage signal (which is the analog read signal) is then processed and converted to digital form for use by the host.

There are many variables that can affect the read performance of a magnetic disk drive. One of the variables, for example, is the flying height of the transducer above the disk surface during the read. If the transducer is not within a specific flying height range during the read operation, the number of read errors that are created increases significantly. Another variable that affects read performance is the strength and position of the magnetic polarity transitions on the surface of the disk. If the transitions are weak or the data is not properly "centered" on the track, then the signal to noise ratio (SNR) of the analog read signal will be correspondingly low and poor read performance may result. Another variable that can affect the read performance of the disk drive is the presence of foreign particles or other aberrations on the surface of the disk that modulate the analog read signal when passed by the transducer. Signal distortions created by such particles are known as thermal asperities. When the transducer impacts a particle on the disk surface, the collision between the transducer and the particle generates a finite amount of heat that can change the read response of the transducer. For example, in a transducer having an MR read element, the heat generated by the collision changes the temperature of the MR strip which modulates the resistance of the strip. This resistance modulation adds an undesired baseline shift to the resulting analog read signal which can significantly increase the bit error rate of the disk drive.

Therefore, a need exists for a method and apparatus for recovering from the deleterious effects of thermal asperities. That is, there is a need for methods to accurately recover data from analog read signals having thermal asperity-type distortions.

SUMMARY OF THE INVENTION

An apparatus for correcting read errors in a disk drive is disclosed herein. In one embodiment, the apparatus includes means for determining that an undesired distortion exists in a data signal read from a surface of a data storage disk; means for finding an approximate starting location of said distortion within said data signal; and, means for correcting errors in said data signal caused by said undesired distortion using said approximate starting location of said distortion.

A method for correcting read errors in a disk drive is also disclosed. In one embodiment, the method includes the steps of (1) providing an error correction code (ECC) that is capable of locating and correcting errors in a data signal; (2) determining that a data signal read from a surface of a data storage disk includes a distortion; (3) finding an approximate starting location of said distortion within said data signal; and, (4) performing error correction procedures on said data signal, based on said ECC, using said approximate starting location of said distortion.

BRIEF DESCRIPTION OF THE DRAWINGS

FIG. 9 is a graph illustrating data manipulations that may be performed while implementing the process of FIGS. 8a and 8b;

DETAILED DESCRIPTION

The present invention relates to a system for use in recovering useable data from a data storage disk having an aberration on a surface thereof that affects read accuracy. The aberration can be, for example, a foreign particle on the surface of the disk which is either embedded in the disk or floating on top of the disk lubricant. The system is particularly apt for use in magnetic data storage systems that utilize magnetoresistive read elements.

Figure 1:
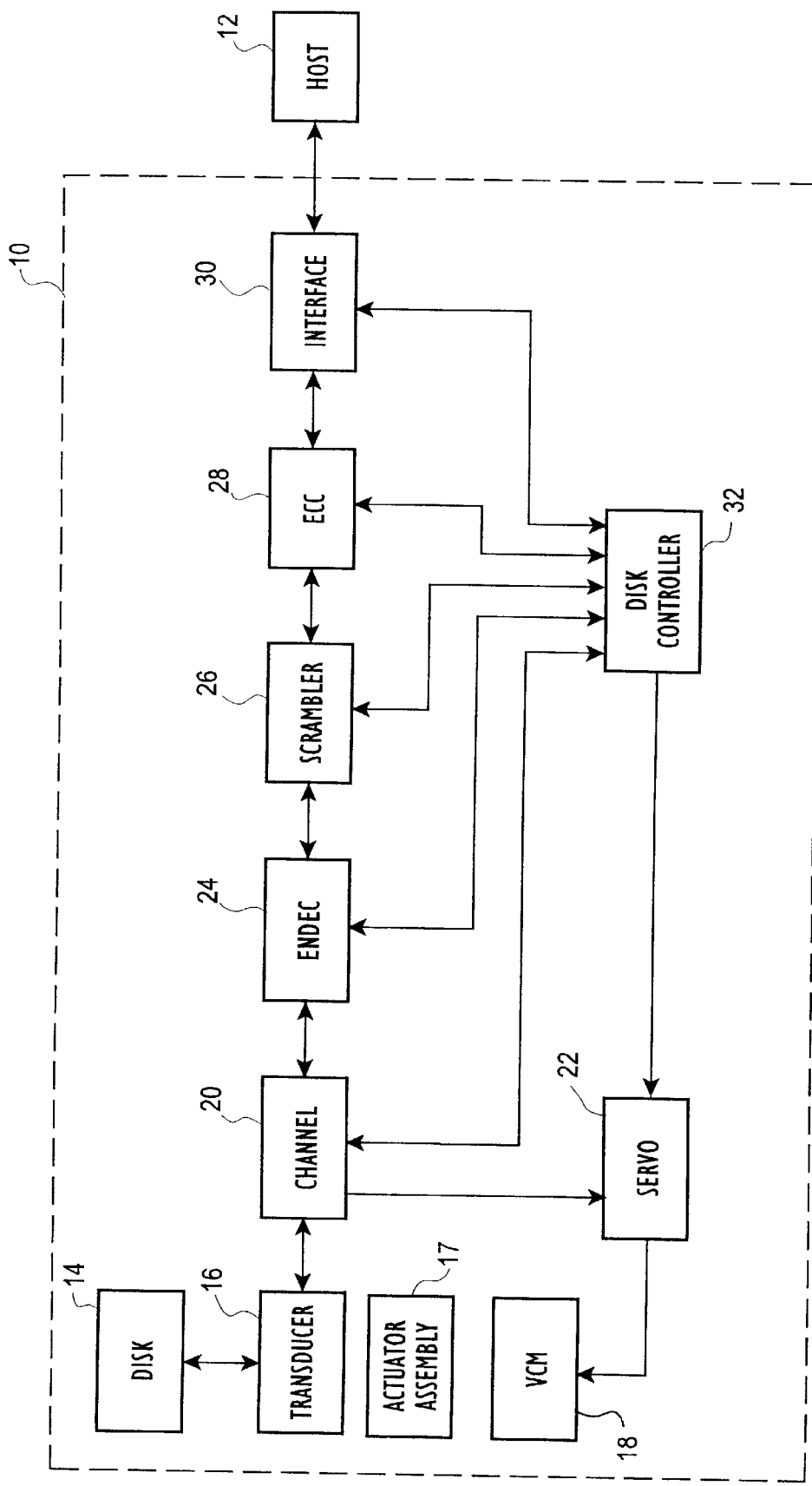
FIG. 1 is a block diagram illustrating a typical magnetic disk drive system that can utilize the techniques of the present invention.

FIG. 1 illustrates a typical magnetic disk drive 10 that can include features of the present invention. The disk drive 10 is connected to a host computer 12 that uses the disk drive 10 as a mass storage device for storing user data, programs, and/or other information. During operation, the host 12 sends access commands to the disk drive 10 requesting the performance of read and/or write operations. A read operation involves the transfer of information from a storage medium within the disk drive 10 to the host 12. A write operation involves the transfer of information from the host 12 to the storage medium of the disk drive 10.

The disk drive 10 includes: a disk 14, a transducer 16, an actuator assembly 17, a voice coil motor (VCM) 18, a read/write channel 20, a servo unit 22, an encoder/decoder (ENDEC) 24, a scrambler 26, an error correction coding (ECC) unit 28, an interface 30, and a disk controller 32. As discussed previously, the disk 14 is a storage medium used to store digital information in the form of magnetic polarity transitions. The disk 14 is rotated at a substantially constant rate by a spin motor (not shown) that is controlled by a closed loop feedback method. As is well understood in the art, the system 10 can include a plurality of disks all mounted on a single spindle and each serviced by one or more separate transducers. For convenience, however, all discussions herein will assume a single disk system.

The transducer 16 is a device that transfers information to/from the disk 14. In a preferred embodiment of the present invention, the transducer 16 is a dual element head having a magnetoresistive read element and an inductive write element. The transducer 16 is held above the disk 14 by a rotary actuator assembly 17 that pivots about an axis under the power of the VCM 18. The VCM 18 receives movement commands from the servo unit 22 for properly positioning the transducer 16 above a desired track of the disk 14 during read and write operations. The servo unit 22 is part of a feedback loop that uses servo information from the surface of the disk 14 to control the movement of the transducer 16 and the actuator assembly 17. As will be described in more detail shortly, in the preferred embodiment, the servo information is stored in radially aligned servo wedges on the surface of the disk 14 which are periodically sampled by the transducer 16 as the disk 14 rotates.

The channel 20 receives the analog read signal from the transducer 16 and processes the signal to create a digital read signal representative of the data stored on the disk 14. In this regard, the channel 20 requires circuitry for detecting data within the analog read signal. The circuitry can include virtually any type of device capable of detecting data in an analog read signal such as, for example, a peak detector, a decision feedback equalizer (DFE), a finite delay tree search (FDTS) detector, and/or a partial response/maximum likelihood (PRML) detector. The channel 20 may also include means for deriving timing information, such as a read clock, from the analog read signal.

The ENDEC 24 is operative for encoding data being transferred to the disk 14 from the host 12. Similarly, the ENDEC 24 is operative for decoding data being transferred from the disk 14 to the host 12. Data being written to the disk is encoded for a number of reasons, including timing and detection concerns. The ENDEC 24 can impart, for example, a run length limited (RLL) code on the data being written to the disk 14 to ensure that the number of "zeros" between nearest "ones" in the bit stream does not exceed or fall below predetermined limits. Such coding ensures that, among other things, enough "ones" exist in the read data to maintain an accurate read clock. Other coding schemes may also be employed in the ENDEC 24.

The scrambler 26 is a device that performs a predictable math operation on input data to produce an output data string that appears to be random. Scrambling data prevents the occurrence of long strings of worst case patterns in the data that can result in a higher bit error rate. Data from the host 12 is scrambled while being transferred to the disk 14 during a write operation and is descrambled while being transferred to the host 12 during a read operation. The descrambling process consists of performing the same predictable math operation that is used to scramble the data. One commonly used scrambler process is known as a pseudo-random process. Although scramblers generally increase the performance of disk drives, they are not always included in commercially available disk drives.

The ECC unit 28 is operative for adding redundant information to the data from the host 12 before that data is written to the disk 14. This redundant information is used during subsequent read operations to locate and correct errors within the read data. Errors in the read data can result from any number of mechanisms, such as: (1) detection or timing errors the channel, (2) poor transducer placement and/or adjacent track noise during the read operation, (3) poorly written data, and (4) foreign matter on the disk surface. ECCs are generally capable of correcting up to a predetermined number of errors in a data block. If more than this number of errors exist, then the code will not be able to correct the errors but may still be able to locate the errors within the block. ECC functionality is generally implemented in software.

The interface 30 is used to establish and maintain communication between the host 12 and the disk drive 10. That is, the interface 30 recognizes the connection protocols of the host 12. In addition, all transfer of information into and out of the disk drive 10 takes place through the interface 30. For example, the interface 30 receives write data and access commands from the host 12 and transfers read data to the host 12. The interface 30 transfers all access requests from the host 12 to the disk controller 32 for processing. Write data received from the host 12 is transferred directly to the ECC unit 28. The interface 30 may also include buffer means for equalizing data flow rates into and out of the disk drive 10.

The disk controller 32 is operative for controlling the operation and timing of the other elements of the system 10. In addition, the disk controller 32 may actually perform the functions of some of the elements of the system. For example, the disk controller 32 may perform the randomization function of the scrambler 26 and/or the correction function of the ECC unit 28 if hardware based units are not being used.

Figure 2:
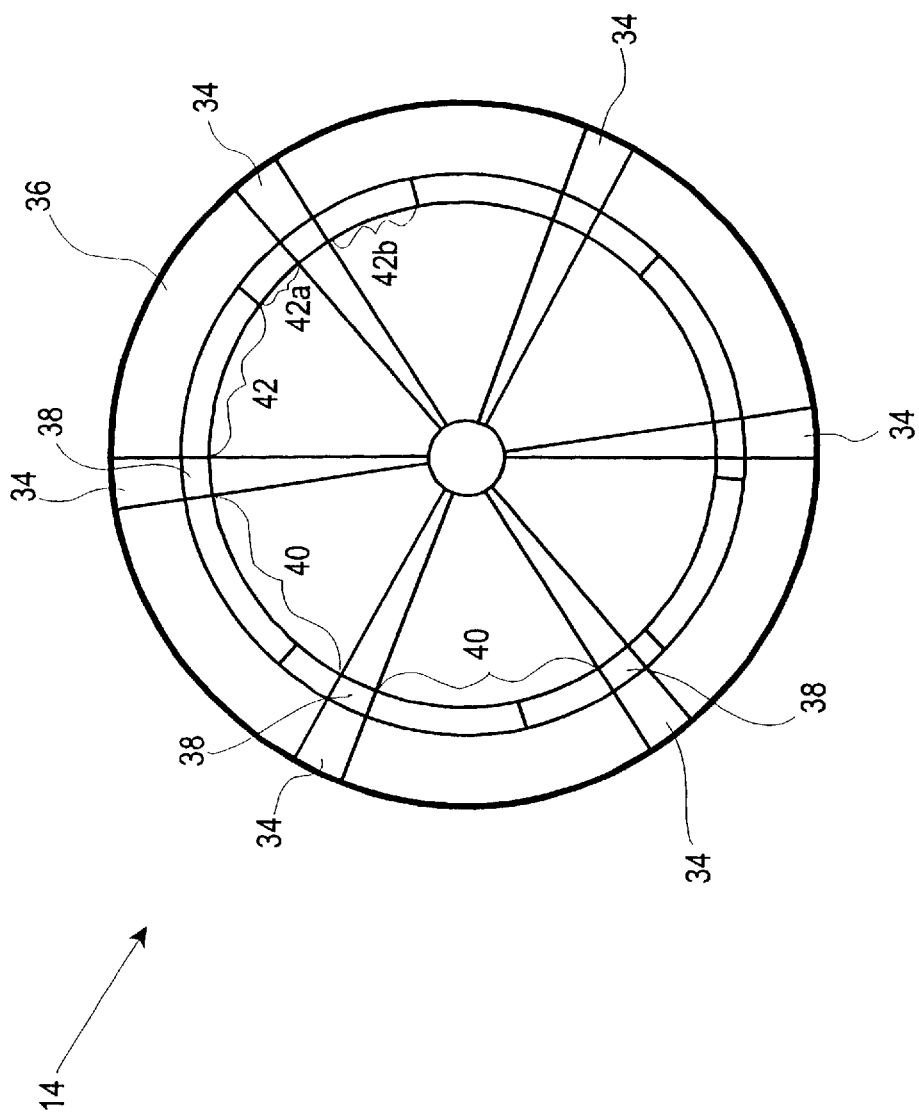
FIG. 2 is a top view of a magnetic disk illustrating a typical information pattern on the surface of the disk.

FIG. 2 illustrates a typical information pattern on the surface of the disk 14. The pattern includes a plurality of concentric tracks 36 for the storage of information on the disk (although for convenience of illustration, only a single track 36 is shown in FIG. 2). The tracks 36 are each divided into a plurality of alternating servo regions 38 and data regions 40. The servo regions 38 are radially aligned from track to track to form a plurality of servo wedges 34 on the disk surface. As discussed previously, the method 10 continuously samples the servo wedges 34 as the disk spins for use in accurately locating the transducer 16 above a desired track. The data regions 40 are further divided into data sectors 42 that can be larger, smaller, or the same size as the data regions 40. The data sectors 42, in general, have a data size that is prescribed by the host 12. As illustrated in FIG. 2, the data sectors 42 can be split into multiple portions by an intervening servo wedge 34 so that a first portion of the data sector 42a is located on one side of the servo wedge 34 and a second portion of the data sector 42b is located on the other side of the servo wedge 34. It should be appreciated that other information storage patterns may also be used in connection with the present invention including dedicated servo patterns, hybrid servo patterns, constant linear density patterns, zoned pattern, fixed block architecture (FBA) patterns, and sectored servo patterns having servo data that is not radially aligned.

Figure 3:
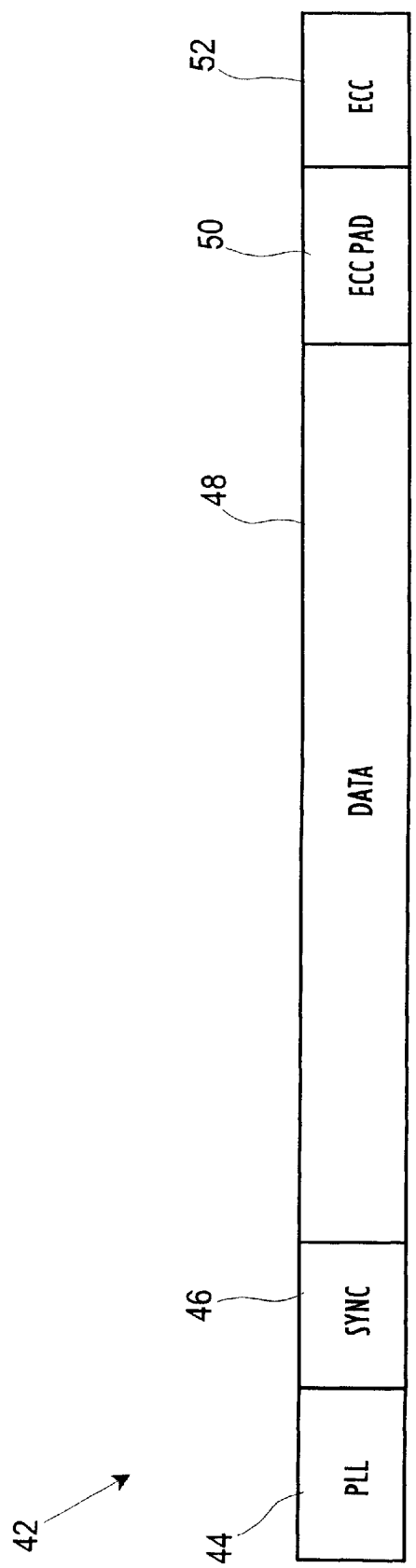
FIG. 3 is a diagram illustrating the information fields that are stored in a data sector in one embodiment of the present invention.

FIG. 3 is a diagram illustrating the fields in a data sector 42 in accordance with one embodiment of the present invention. As illustrated, each data sector, 42 includes: a phase locked loop (PLL) field 44, a synchronization (SYNC) field 46, a data field 48, an ECC pad field 50, and an ECC field 52. The PLL field 44 and the SYNC field 46 are each used in initially synchronizing the read clock to the information being read from the disk 14. The fields 44,46 include known repetitive patterns to which the clock can be synchronized very rapidly. Once the clock has been synchronized to these fields 44,46, synchronization is maintained by phase locking the clock to the user data being read from the data field 48. As will be described in greater detail shortly in connection with FIG. 4, a phase locked loop (PLL) in the channel 20 can be used to maintain lock on the incoming user data. The ECC field 52 includes the redundant information that is added by the ECC unit 28 for use in locating and correcting errors in the read data. The ECC pad field 50 includes a known data pattern of predetermined length (preferably, one byte) that, in the preferred embodiment, is the same in every data sector on the disk surface. In accordance with the present invention, the data pattern in the ECC pad field 50 can be used for a number of purposes. For example, the pattern can be used to determine whether lock was lost during a read operation as the result of a thermal asperity. That is, if the pattern is not found in the right position within the read data after the thermal asperity occurs, then lock was most likely lost. In addition, the pattern can be used, as will be discussed in greater detail, to byte align the read data after a loss of lock.

Figure 4:
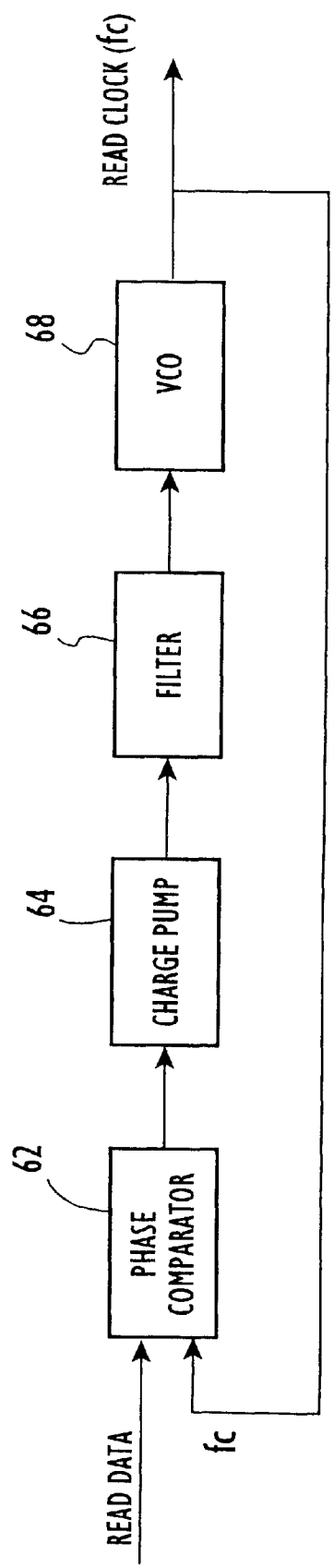
FIG. 4 is a block diagram illustrating a typical phase locked loop circuit that can be used in the disk drive of FIG. 1.

FIG. 4 is a block diagram illustrating a typical phase locked loop (PLL) 60 that can be used to maintain synchronization between a read clock and incoming read data. The PLL 60 can be located in the channel 20 of method 10 or in another suitable location. The PLL 60 of FIG. 4 includes: a phase comparator 62, a charge pump 64, a filter 66, and a voltage controlled oscillator (VCO) 68. The phase comparator 62 receives read data from the disk 14 at a first input and a clock signal from the VCO 68 at a second input. The phase comparator 62 compares the two signals and outputs a voltage signal that is related to the difference between the phases of the two signals. The charge pump 64 and the filter 66 process the voltage signal from the phase comparator 62 to create an adjustment signal for delivery to the VCO 68. The adjustment signal adjusts the operational frequency of the VCO 68 in a manner that tends to minimize the phase difference between the clock signal and the data signal thereby "locking" the clock signal to the data signal. Therefore, any variations in the read data rate caused by, for example, fluctuations in disk speed are accounted for in the clock signal. This clock signal can then be used by other elements in the disk drive 10 during the processing of the read data.

Figure 5:
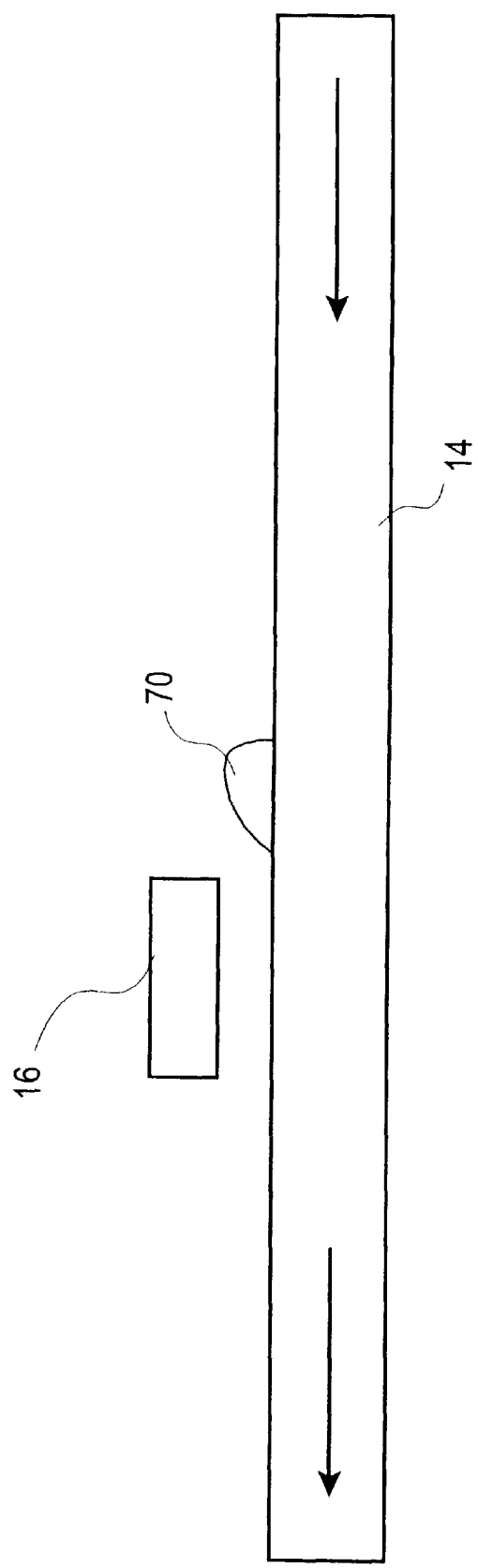
FIG. 5 is a diagram illustrating the creation of a thermal asperity in a disk drive.

FIG. 5 is a diagram illustrating the creation of a thermal asperity in the disk drive 10. During a read operation, the transducer 16 rides on a cushion of air above the disk 14 created by the rotation of the disk 14 in the direction of the arrows. Although not shown, the transducer 16 is properly positioned above a desired track on the disk 14 using the VCM/actuator assembly and the closed servo loop. While reading from the desired track, the transducer 16 approaches a particle 70 embedded in the upper surface of the disk 14. The transducer 16 collides with the particle 70 creating heat from the friction of the collision. The heat increases the temperature of the transducer 16 which modulates the resistance of the magnetoresistive strip within the transducer 16. This modulated resistance results in signal distortions within the analog read signal.

Figure 6:
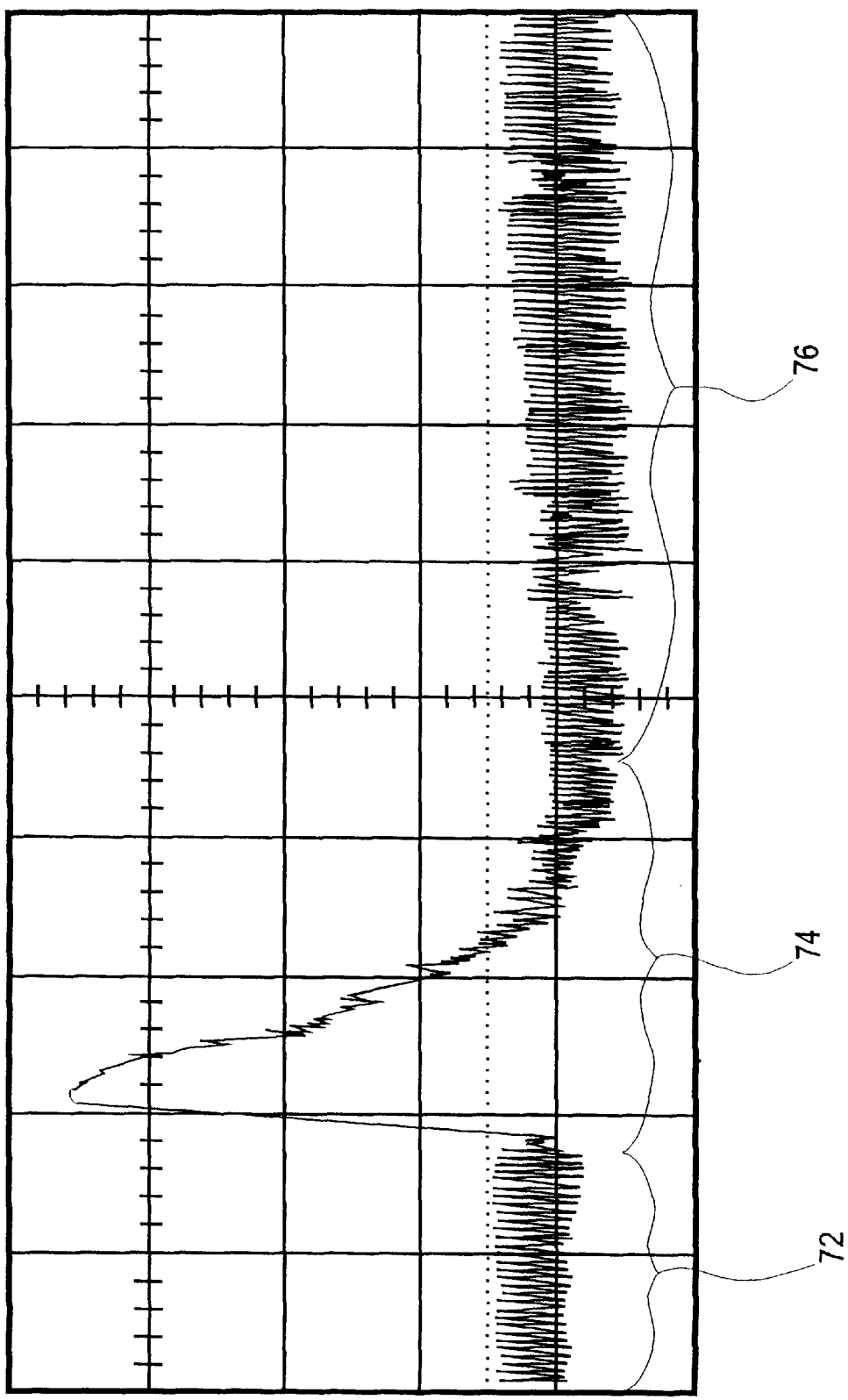
FIG. 6 is a graph illustrating an analog read signal including a thermal asperity-type distortion.

FIG. 6 is a graph illustrating an analog read signal including thermal asperity distortion. As illustrated, the signal includes a first portion 72 that was read before the transducer 16 collided with the particle 70, a second portion 74 that was read during and slightly after the collision and displaying most of the thermal asperity distortion, and a third portion 76 that was later read after the collision. As is apparent from the graph, the collision between the transducer 16 and the particle 70 results in a large shift in the baseline of the analog read signal. As discussed above, this is caused by the temperature rise of the transducer 16 and the resulting resistance change. The transducer 16 eventually cools down after which the baseline of the analog read signal returns to approximately the level it was at before the collision.

As can be surmised, a significant amount of data can be corrupted during the second portion 74 of the analog read signal. That is, the data detection device within the channel 20 may not be able to accurately detect data within the second portion of the analog read signal due to the large baseline shift. If the amount of corrupted data is within the correction capabilities of the ECC unit 28, then the corrupted data can be recovered by correcting the data errors. However, if the effects of the thermal asperity are relatively long lived, the number of data errors will exceed the correction capabilities of the ECC unit 28. In addition, there is a strong possibility that the phase locked loop 60 will lose lock during the second portion 74 of the analog read signal. If phase lock is lost during the thermal asperity, all read data from the beginning of the thermal asperity to the end of the sector may be corrupted if lock is not regained. If lock is regained after the thermal asperity, the data within the portion of the read signal after the thermal asperity may not be properly byte aligned. If byte alignment is lost, ECC correction will not be effective even if the number of read errors is within the correction capabilities of the ECC.

In conceiving of the present invention, it was appreciated that the computational power of a typical ECC unit is split between error location functions and error correction functions. That is, if the ECC unit has to search for errors within a data stream, then the amount of computational power that can be devoted to error correction is diminished. In accordance with the present invention, the approximate start location of the thermal asperity is determined prior to the performance of error location/correction on the affected data sector. The approximate start location of the thermal asperity is then transferred to the ECC unit 28 for use in correcting the errors. Because the ECC unit 28 does not have to search for the errors (i.e., the errors will all occur relatively close to the start location), more computational power is devoted to error correction and more errors can be corrected. In one system, it was found that the number of 9-bit symbols that could be corrected was increased from 9 when using conventional ECC correction to 15 when using the targeted correction procedures of the present invention. It was also found that the start location of the thermal asperity does not have to be precisely located for the techniques of the present invention to be effective. That is, good results can be achieved even if the start address used during targeted correction is off by up to 5 bytes or more.

Figure 7:
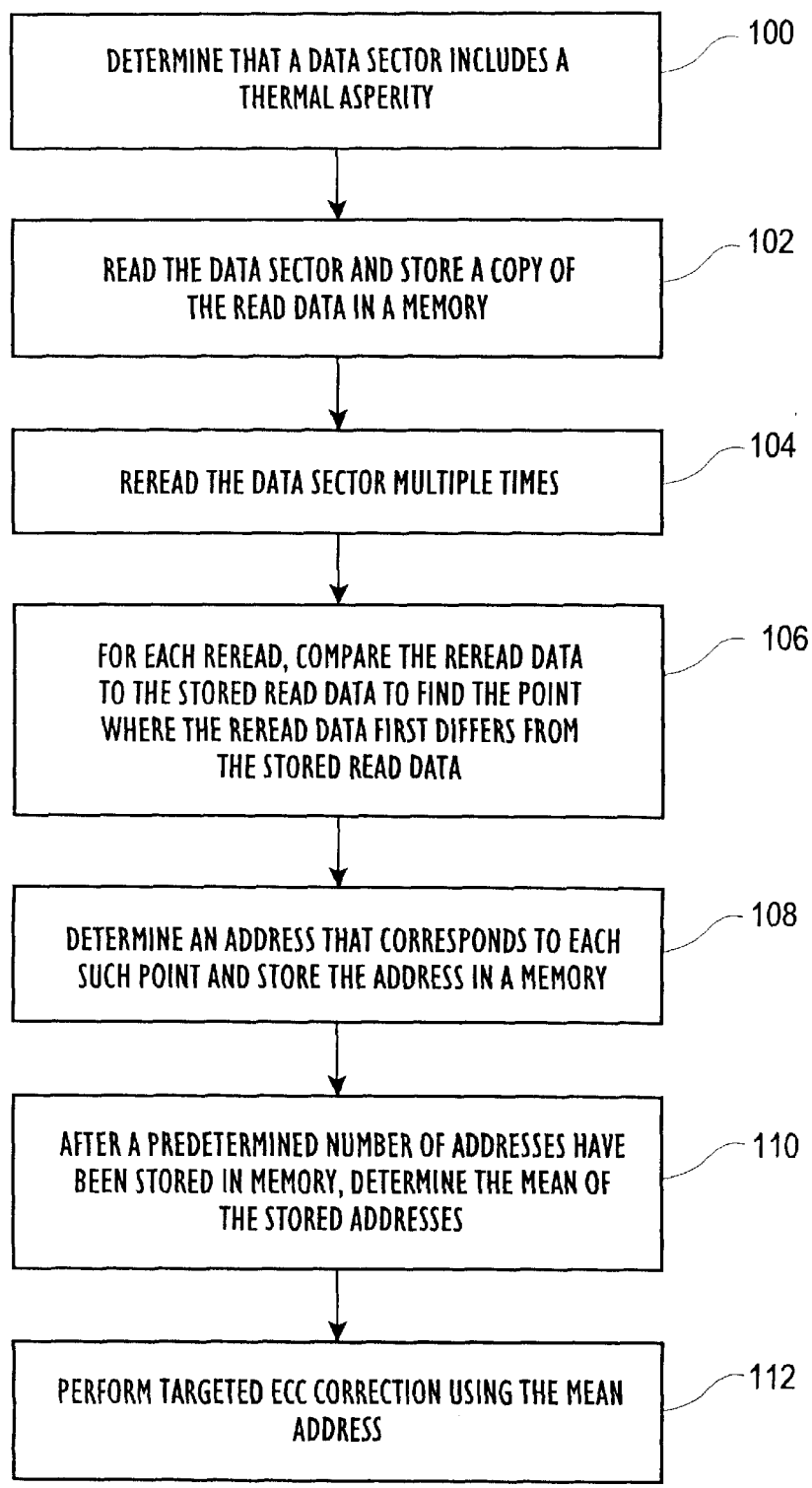
FIG. 7 is a flowchart illustrating a process for recovering data from an analog read signal having thermal asperity-type distortion in accordance with one embodiment of the present invention.

The present invention can utilize any method for determining the approximate starting location of the thermal asperity. For example, in one embodiment, a peak detector having a relatively high threshold is used to detect the beginning of the baseline shift in the analog read signal. In another embodiment, as illustrated in the flowchart of FIG. 7, a data comparison is used to detect the approximate start location of the thermal asperity. When a foreign particle or other aberration exists within a sector of a disk, data read from that sector tends to change from read operation to read operation. Based on this, it was determined that the approximate start location of the thermal asperity could be found by performing multiple read operations in the affected sector and determining where the read data begins to differ between reads.

FIG. 7 is a flowchart illustrating a process for recovering data from an analog read signal having thermal asperity-type distortion. As mentioned above, the process includes a method for detecting the approximate start location of the thermal asperity. First, it is necessary to determine that a particular data sector on the disk 14 includes a thermal asperity (step 100). Generally, if the data stored within a sector on the disk 14 is unrecoverable after a number of retries have been attempted, then it assumed that a thermal asperity is present and thermal asperity recovery procedures are initiated. It should be appreciated that other methods of determining that a thermal asperity is present, such as by peak detection, can also be used in accordance with the present invention. A first read operation is performed on the affected sector and the read data is stored in a memory (step 102). The memory used can be any available memory in the disk drive including, for example, the controller RAM, the buffer, or even the disk itself The affected sector is then reread one or more times (step 104). For each of the rereads, the resulting read data is compared to the read data from the first read operation (that is stored in the memory) to determine where the reread data first starts to differ from the stored data (step 106). An address corresponding to the point where the data first begins to differ is then determined and stored in memory (step 108). The address can be relative to, for example, a nearest word boundary within the data stream. After a predetermined number of addresses are stored in the memory, a mean address is determined (step 110). In a preferred embodiment of the present invention, the mean address is determined after 10 addresses have been stored in memory. The mean address is then used to perform targeted ECC correction in, for example, the ECC unit 28 (step 112). The format of the mean address may need to be converted before use by the ECC unit 28. For example, in one embodiment of the present invention, the mean address is converted from a format that is relative to a word boundary to a format that is relative to a byte boundary before use by the ECC unit 28.

As described above, a thermal asperity can cause a loss of phase lock on an incoming data stream. In addition, if the thermal asperity occurs during the PLL field 44 or the SYNC field 46, proper channel bit synchronization is not achieved at the beginning of the data field 48. Both of these situations can result in a loss of byte alignment in the read data following the thermal asperity. That is, even if phase lock to the data is reestablished after the occurrence of the thermal asperity, the disk drive will not know where the byte boundaries are located within the data stream. Without knowing the byte boundaries, the data field 48 cannot be properly separated from the ECC field 52 and ECC correction is impossible. In accordance with the present invention, procedures are provided for regaining byte alignment for data following a thermal asperity should channel lock be temporarily lost. The procedures involve repeated ECC retries while shifting the data following the thermal asperity start location by various amounts. The procedures each make use of the approximate thermal asperity start location previously determined.

Figure 8A:
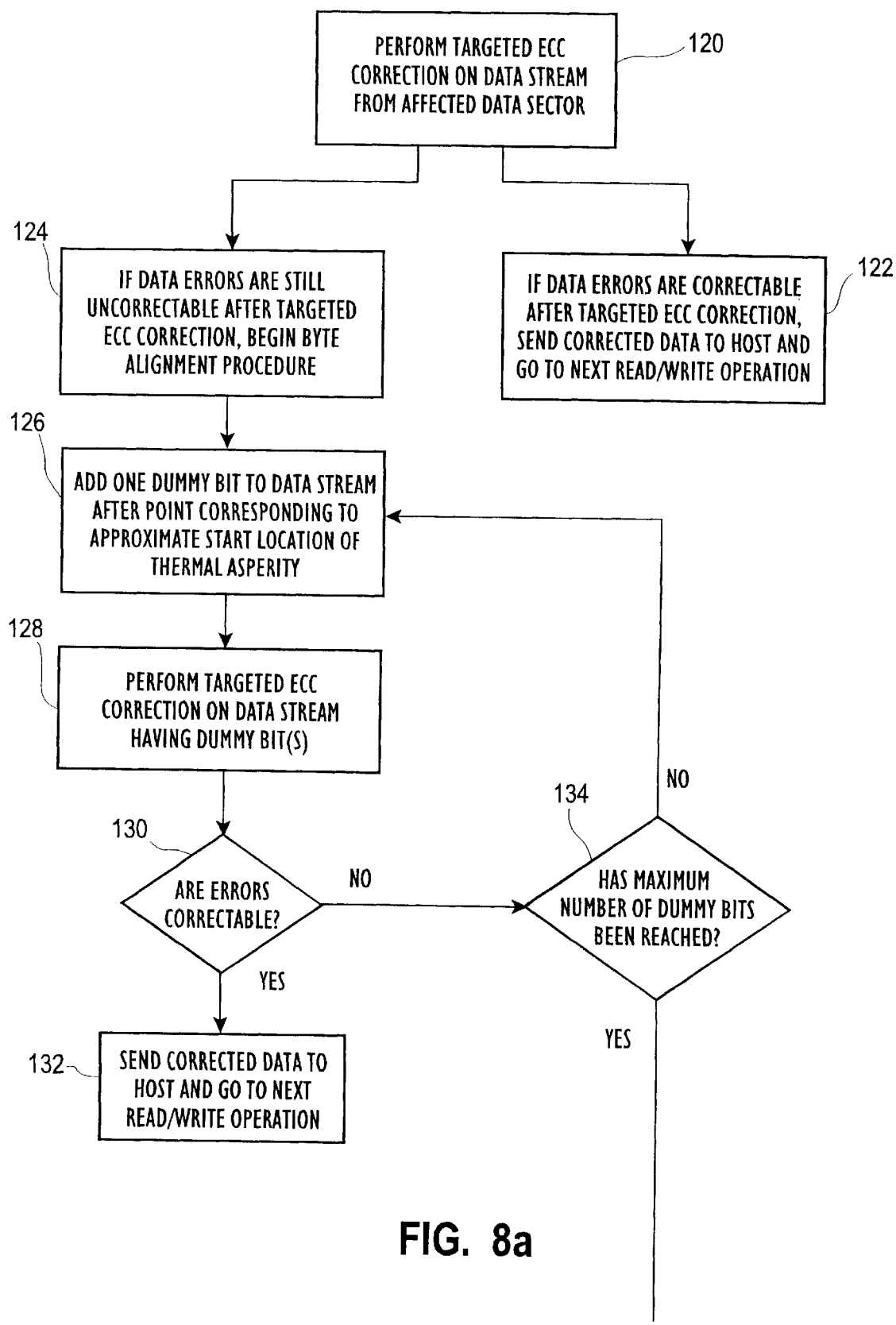
FIGS. 8a and 8b are two portions of a flowchart illustrating a process, in accordance with one embodiment of the present invention, for regaining byte alignment in a data stream after a loss of timing lock resulting from the occurrence of a thermal asperity.
Figure 8B:
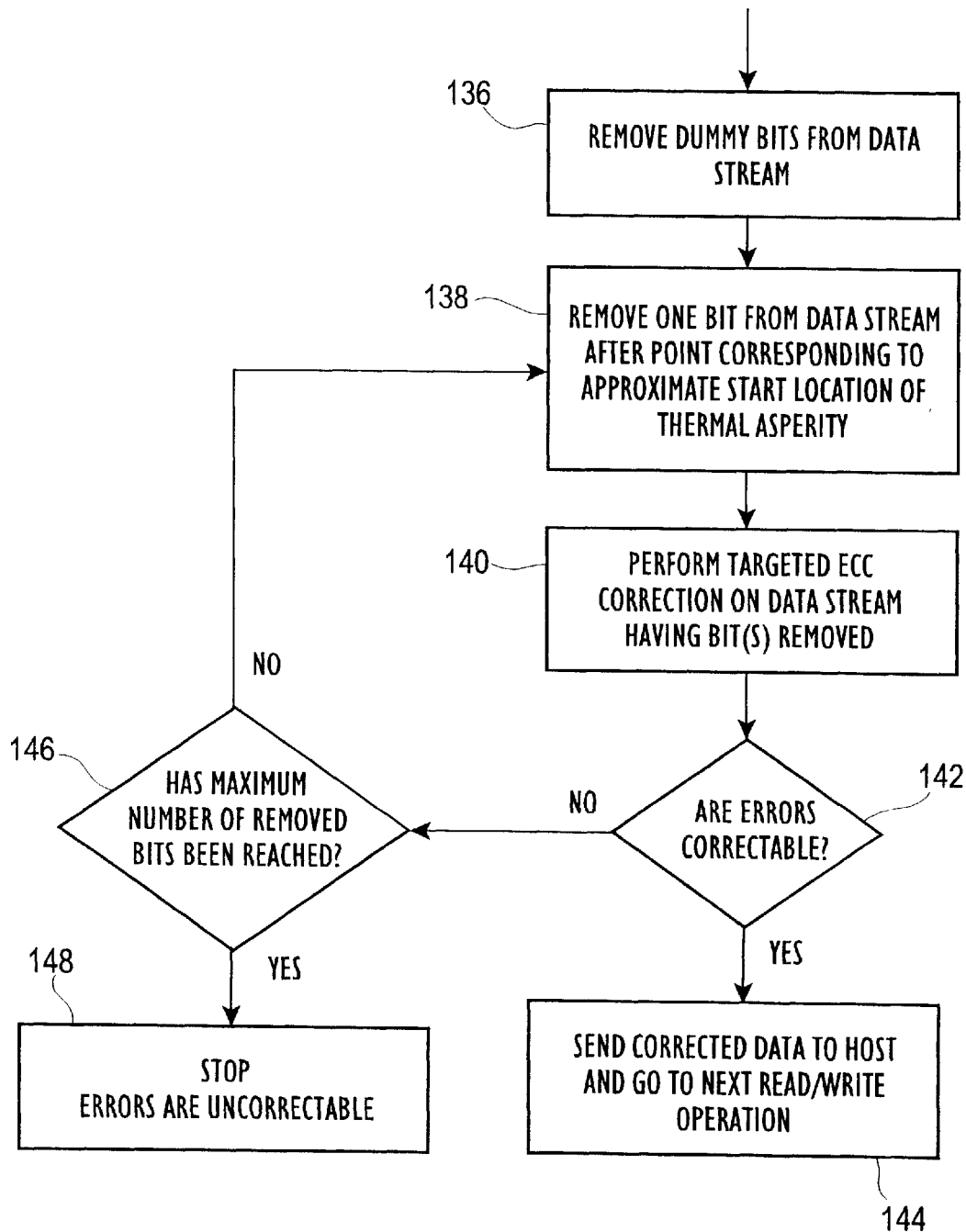

FIGS. 8a and 8b are two portions of a flowchart illustrating a process in accordance with the present invention for regaining byte alignment in data following a thermal asperity, for a disk drive that does not include a scrambler 26. First, targeted ECC correction is attempted using the procedures described above (step 120). If the errors in the data are corrected, then the data is delivered to the host 12 and byte alignment does not have to be performed (step 122). If the errors are not corrected, the byte alignment process is initiated (step 124). The affected data sector is read and the read data stream is stored in a memory. Data stored previously during, for example, determination of the approximate start location of the thermal asperity can be used in this regard. A dummy data bit is added to the stored data stream at the beginning of the portion of the data stream that follows the approximate start location of the thermal asperity (step 126). The dummy bit can be any allowable bit, such as a one bit or a zero bit. Targeted ECC correction is then attempted on the data stream having the dummy bit (step 128). If the data stream errors are correctable (step 130), then the corrected data is delivered to the host 12 and the next access request is processed (step 132). If the data stream errors are not correctable (step 130), the system determines whether a maximum number of dummy bits have been added to the data stream (step 134). If the maximum number has not been reached, another dummy bit is added to the beginning of the portion of the data stream that follows the approximate start location of the thermal asperity and targeted ECC correction is again tried (steps 126, 128, and 130 are repeated). This continues until the data has been corrected or the maximum number of dummy bits has been added.

If correction is not achieved by adding dummy bits to the data stream, the dummy bits are removed from the data stream (step 136) and data bit removal is attempted. A first bit is removed from the data stream at the beginning of the portion of the data stream that follows the approximate start location of the thermal asperity (step 138). Targeted ECC correction is then attempted (step 140). If the correction is successful (step 142), the corrected data is delivered to the host 12 and the drive goes on to the next access request (step 144). If the errors are not corrected (step 142), the system determines whether the maximum number of removed bits has been reached (step 146). If the maximum number of removed bits has not been reached, another bit is removed and targeted ECC correction is again attempted (steps 138, 140, and 142 are repeated). This continues until the data has been corrected or the maximum number of removed bits has been reached. If the maximum number has been reached without correction of the data, the procedure is stopped and the errors in the data stream are deemed uncorrectable (step 148).

Figure 9:
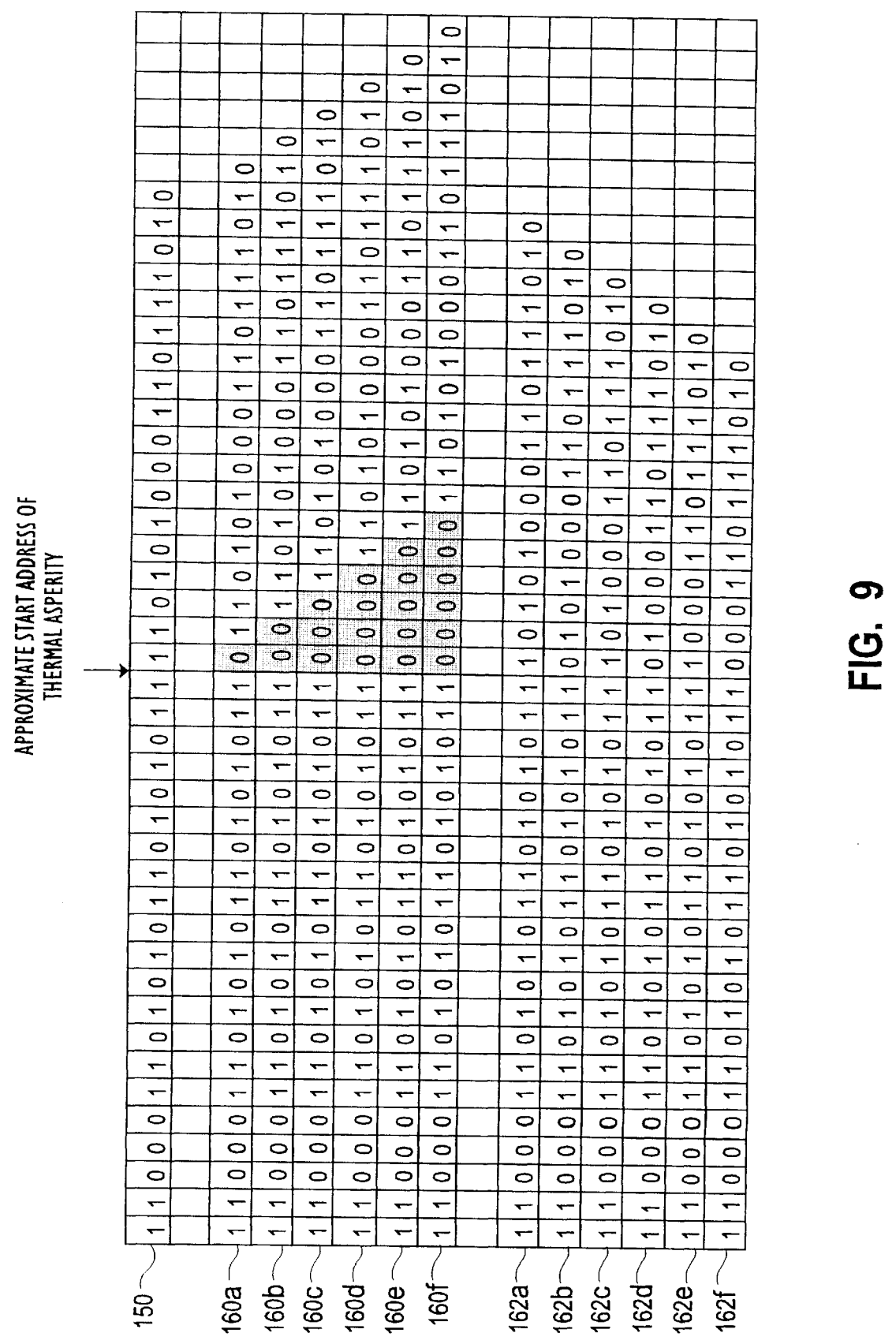

FIG. 9 is a graph illustrating the data manipulations used to implement the above-described byte alignment process. Each of the rows represents the data stream read from the affected data sector at various stages in the byte alignment process. Row 150 represents the actual data read from the sector, rows 160a–160f represent the data stream with dummy bits added, and rows 162a–162f represent the data stream with data bits removed. It should be appreciated that the number of data bits in a data stream will typically be much greater than the data streams illustrated in FIG. 9. As seen in the shaded area of the graph, the dummy bits that are added to the data stream are all zeros and the maximum number of dummy bits is six. Likewise, the maximum number of removed bits is six. It should be appreciated that these maximum numbers are a matter of design choice and do not need to be equal to one another. Until the errors in the data are corrected, each of the data streams 150, 160a–160f, 162a–162f will be subject to targeted correction in the ECC unit 28. If correction is not achieved after all of the data streams 150, 160a–160f, 162a–162f have been tried, the errors are deemed to be uncorrectable.

Figure 10A:
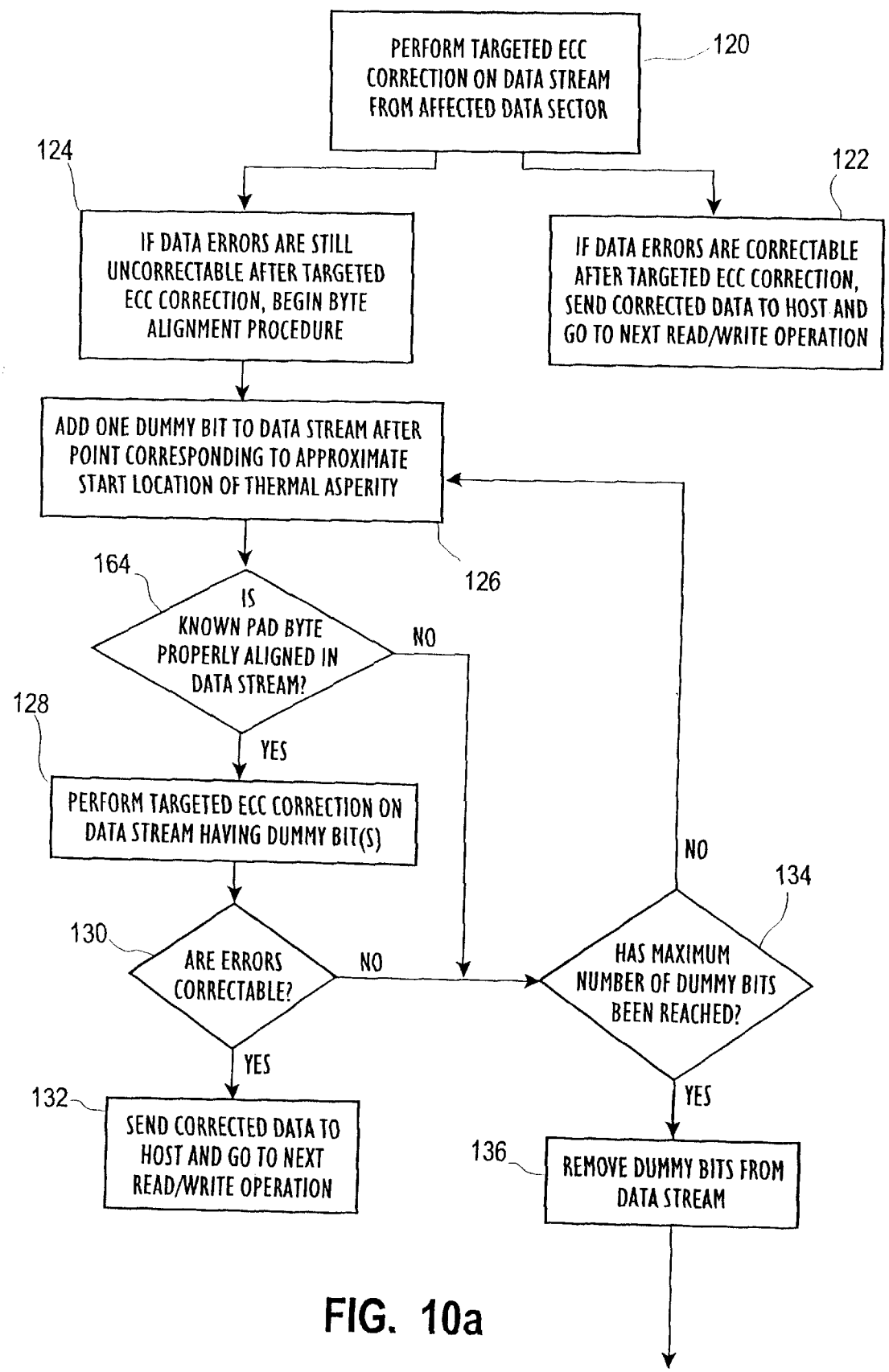
FIGS. 10a and 10b are two portions of a flowchart illustrating a process, in accordance with another embodiment of the present invention, for regaining byte alignment in a data stream after a loss of timing lock resulting from the occurrence of a thermal asperity.
Figure 10B:
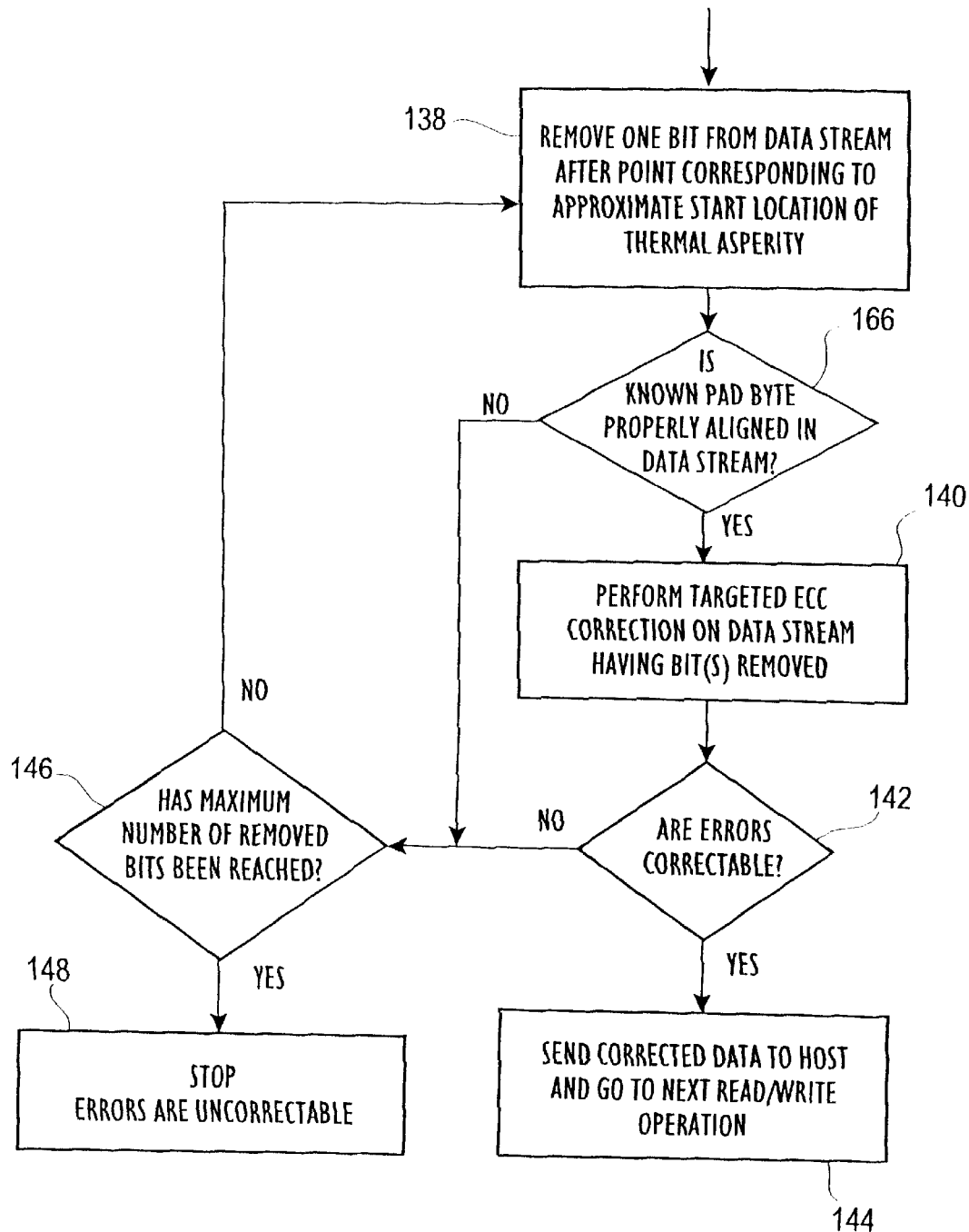

FIGS. 10a and 10b illustrate another process for regaining byte alignment after a thermal asperity. The process is similar to the process of FIGS. 8a and 8b, but can only be used in a system that uses a data sector format including an ECC pad field 50 (see FIG. 3). As discussed previously, an ECC pad field 50 is a known data pattern, preferably one byte long, that is placed either before or after the ECC field. In a preferred embodiment, the same pattern is used for every sector on the disk 14. Because the known pattern is located in a known location on the disk, detection of a different pattern in the position that is supposed to carry the known pattern, during a read operation, indicates that byte misalignment has probably occurred during the read. As will become more apparent shortly, use of the ECC pad field 50 allows the byte alignment process to be performed more rapidly by reducing the number of targeted ECC corrections that need to be performed. For convenience, the reference numerals used in FIGS. 10a and 10b are the same as those used in FIGS. 8a and 8b for identical steps.

With reference to FIG. 10a, targeted ECC correction is performed on the data stream as read from the affected sector (step 120). If the errors in the data stream are corrected, the data is sent to the host and the next read/write operation is initiated (step 122). If the errors are not correctable, the byte alignment procedure is initiated (step 124). As before, a dummy bit is added to the portion of the data stream after the thermal asperity start location (step 126). However, targeted ECC correction is not immediately attempted. First, a comparison is performed to see if the known ECC pad byte is in the correct location in the data stream (step 164). If the pad byte is not present, it is assumed that byte misalignment has occurred in the data stream and ECC correction is not attempted. Instead, a next dummy bit is added to the data stream and the comparison is repeated. It is not until a match is found between the known pad byte and the portion of the data stream that is supposed to carry the pad byte, that ECC correction is attempted (step 128). If the errors are not correctable at this point, the system checks to see if the maximum number of dummy bits have been added and, if not, a next dummy bit is added and the above process is repeated. If the maximum number of dummy bits have been tried without achieving correction (step 134), all dummy bits are removed from the data stream (step 136) and a first data bit is removed from the data stream (step 138). As before, for each bit removed from the data stream, a pattern comparison is performed (step 166). If there is no match, a next bit is removed and the comparison is repeated. If a match is found, ECC correction is attempted (step 140). If the correction is successful (step 142), the corrected data is delivered to the host 12 and the drive goes on to the next access request (step 144), if not, and the maximum number of removed bits has not been reached, another bit is removed and targeted ECC correction is again attempted. This is done until the maximum number of removed bits has been tried (step 146). If data correction has not been achieved at this point, the errors are deemed uncorrectable (step 148).

Figure 11A:
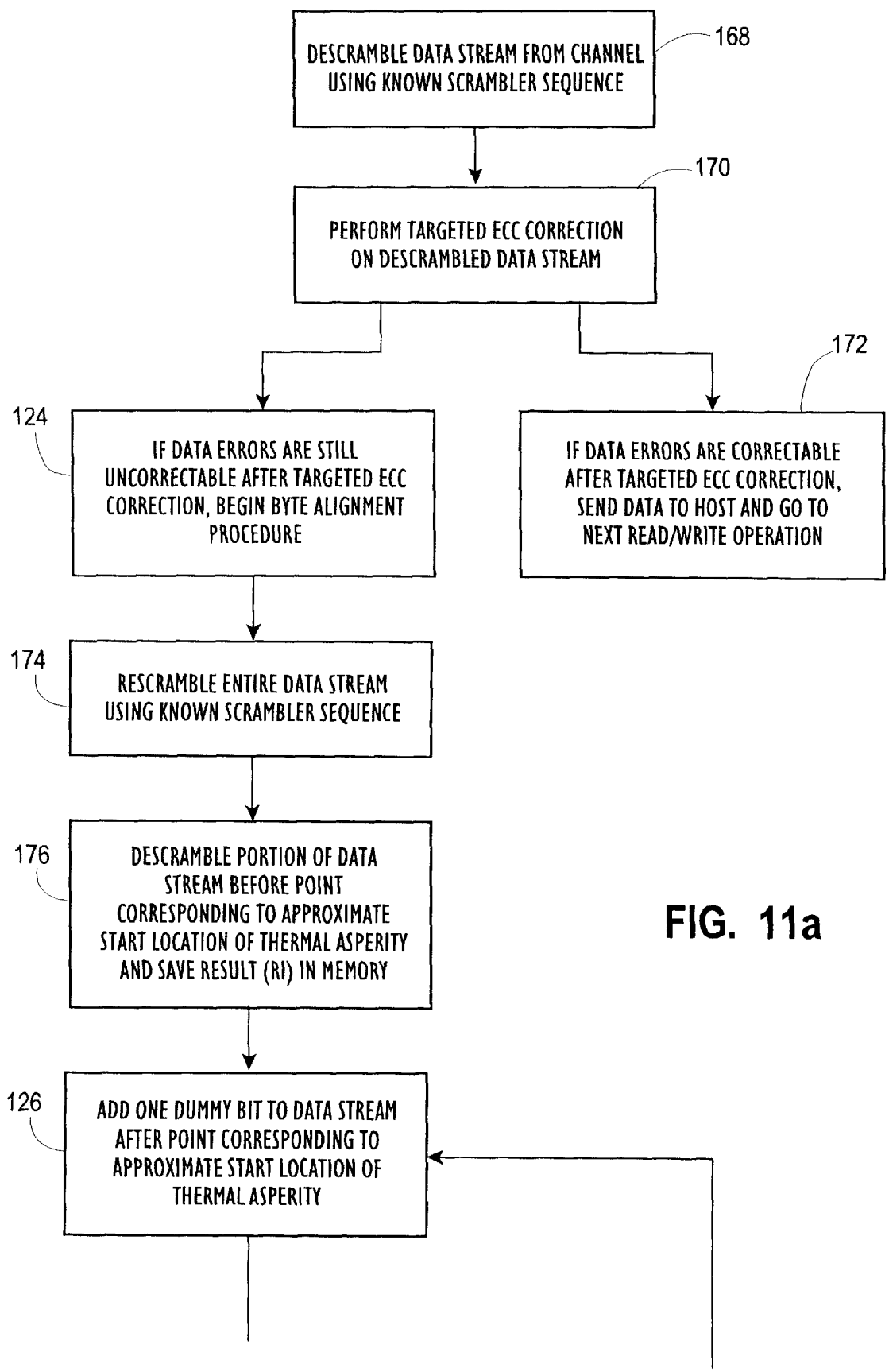
FIGS. 11a, 11b and 11c are three portions of a flowchart illustrating a process, in accordance with yet another embodiment of the present invention, for regaining byte alignment in a data stream after a loss of timing lock resulting from the occurrence of a thermal asperity, the process being for use in a disk drive having a scrambler.
Figure 11B:
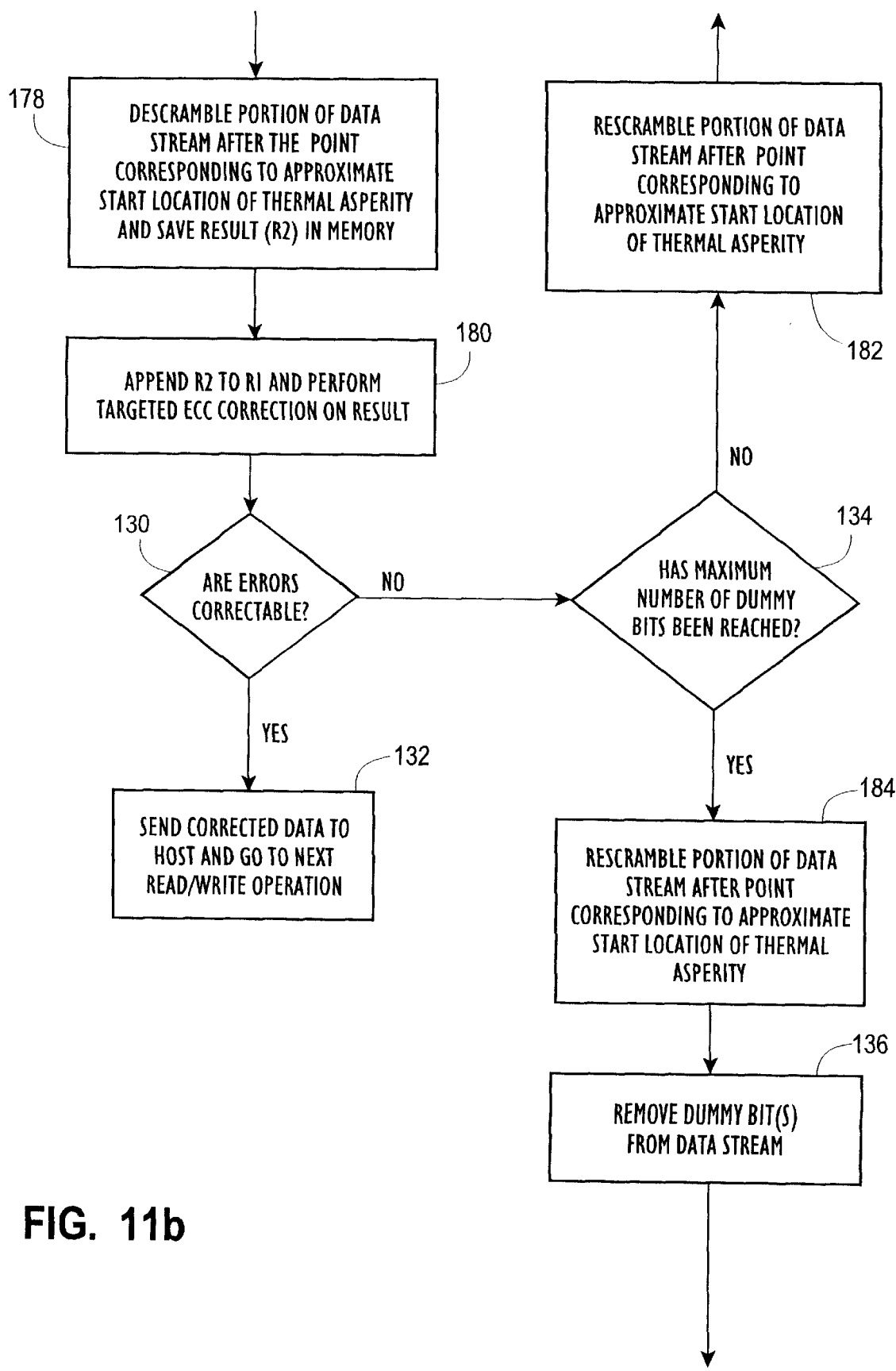
Figure 11C:
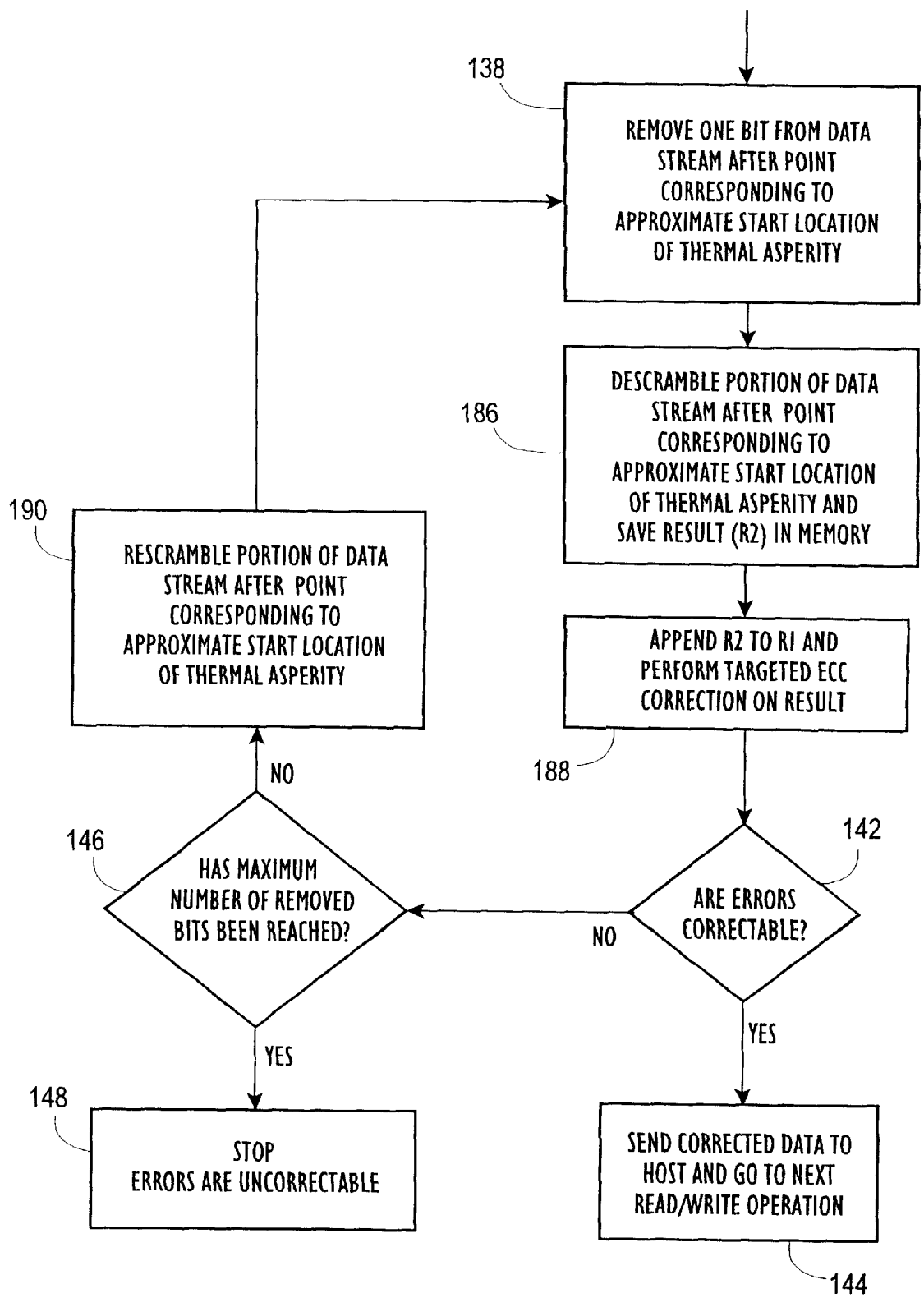

The previous procedures cannot be used in a disk drive that includes a scrambler 26. This is because the addition and/or removal of bits from the data stream has to occur before the data stream is descrambled to properly byte align the data, but ECC correction cannot be attempted until descrambling has been accomplished. FIGS. 11a, 11b and 11c illustrate a process for achieving byte alignment that can be used in a system that includes a scrambler 26. Again, the reference numerals used in FIGS. 11a, 11b and 11c are the same as those used in FIGS. 8a and 8b for identical steps.

With reference to FIG. 11a, after the data is read from the affected sector, the resulting data stream is descrambled in the scrambler 26 using the known scrambler sequence (step 168). Targeted ECC correction is then attempted on the descrambled data stream (step 170). If the errors in the data stream are corrected, the data is sent to the host and the next read/write operation is initiated (step 172). If the errors are not correctable, the byte alignment procedure is initiated (step 124). The entire data stream is then rescrambled (step 174). The portion of the data stream before the start location of the thermal asperity (i.e., the first portion) is then removed from the data stream and descrambled and the result is stored in memory (step 176). A dummy bit is then added to the beginning of the remaining portion (i.e., the second portion) of the data stream (step 126) and this portion is descrambled and the result is stored in memory (step 178). The two descrambled portions in memory are then concatenated and ECC correction is attempted (step 180). If the errors are correctable (step 142), the corrected data is sent to the host 12 (step 132). If not, and the maximum number of dummy bits has not been reached (step 134), the second portion of the data stream is rescrambled (step 182), another dummy bit is added (step 126), the second portion with new dummy bit is descrambled and stored (step 178), the two stored portions are concatenated, and targeted ECC correction is again attempted (step 180). The process is repeated until the data is corrected or the maximum number of dummy bits have been tried.

If data correction has not been achieved, the second portion of the data stream is again rescrambled (step 184) and all dummy bits are removed (step 136). A data bit is then removed from the beginning of the second portion (step 138) and the second portion is descrambled and stored (step 186). The two stored portions (i.e., the first portion and the latest second portion) are concatenated and targeted ECC correction is attempted (step 188). If the errors are correctable (step 142), the corrected data is sent to the host 12 (step 144). If the errors are not correctable (step 142), and the maximum number of removed bits has not been reached (step 146), the second portion is rescrambled (step 190) and another data bit is removed (step 138). The process is repeated until the data stream is corrected or the predetermined maximum number of bits have been removed. If the data has not been corrected by this point, the errors are deemed uncorrectable (step 148). It should be appreciated that the above-described procedure can be modified to make efficient use of an ECC pad field.

With reference to FIG. 3, if a thermal asperity occurs during the sync field 46 of the data sector 42, proper bit synchronization may not be established by the time the transducer 16 reaches the beginning of the data field 48. In this case, the start location of the thermal asperity is taken as byte zero of the data field. One of the byte alignment processes described above may then be performed to properly byte align the read data. In addition, means may be provided for forcing the sync byte at a selected location. That is, the channel 20 or disk controller 32 may have the capability to command the channel 20 to start reading the data bits as though the sync field 46 has been detected at the proper location. If the channel 20 is able to acquire PLL lock prior to the sync field 46, and the sync is forced at approximately the correct location, then the data is likely shifted early or late by one or more bits, and the byte alignment procedures are attempted. If the channel 20 is unable to utilize the PLL field 44, then the sync can be forced at approximately the correct location and channel lock to the data field is performed. In this case, however, the defect period will be longer due to the time required for the channel to lock to the data. Recovery is attempted as previously described.

The techniques of the present invention are preferably implemented as software routines that are carried out by the disk controller 32. The routines can be stored in firmware within the drive or they can be stored on the disk 14 and loaded into controller RAM at power up. In addition, a hardware implementation can also be used.

Although the present invention has been described in conjunction with its preferred embodiment, it is to be understood that modifications and variations may be resorted to without departing from the spirit and scope of the invention as those skilled in the art readily understand. For example, it should be understood that the present invention is not limited to use with thermal asperities. Rather, the invention can be used to recover from any type of error mechanism or defect that causes a portion of the data to be "unrecoverable" or which causes a loss of channel lock. In addition, the invention can be used in other types of data storage systems, such as optical drives and tape drives. Such modifications and variations are considered to be within the purview and scope of the invention and the appended claims.

What is claimed is:

1. A method of correcting a read error in a disk drive, comprising:

reading a disk surface to provide a data signal that includes data bits, error correction code (ECC) bits and ECC pad bits;

detecting an error in the data signal;

determining an approximate location of the error;

testing the data signal by (i) determining whether the pad bits are correct, (ii) performing an error correction procedure on the data bits using the ECC bits and the approximate location of the error if the pad bits are correct, and (iii) skipping the error correction procedure if the pad bits are not correct, wherein the test is successful if the pad bits are correct and the error correction procedure is successful, and the test is not successful if the pad bits are not correct or the error correction procedure is not successful; and shifting the data signal and then repeating the test if the test was not successful.

2. The method of claim 1, wherein shifting the data signal includes inserting a dummy bit into the data signal at the approximate location of the error.

3. The method of claim 1, wherein shifting the data signal includes removing an existing bit from the data signal at the approximate location of the error.

4. The method of claim 1, wherein shifting the data signal and then repeating the test includes:

(a) shifting a dummy bit into the data signal at the approximate location of the error and then repeating the test; and (b) repeating step (a) unless the test was successful or a maximum number of dummy bits have been shifted into the data signal.

5. The method of claim 1, wherein shifting the data signal and then repeating the test includes:

(a) removing an existing bit from the data signal at the approximate location of the error and then repeating the test; and (b) repeating step (a) unless the test was successful or a maximum number of existing bits have been removed from the data signal.

6. The method of claim 1, wherein shifting the data signal and then repeating the test includes:

(a) shifting a dummy bit into the data signal at the approximate location of the error and then repeating the test;

(b) repeating step (a) unless the test was successful or a maximum number of dummy bits have been shifted into the data signal; and if the test was not successful and the maximum number of dummy bits have been shifted into the data signal, then (c) removing the dummy bits from the data signal; then (d) removing an existing bit from the data signal at the approximate location of the error and then repeating the test; and (e) repeating step (d) unless the test was successful or a maximum number of existing bits have been removed from the data signal.

7. The method of claim 6, wherein the maximum number of dummy bits and the maximum number of existing bits are identical.

8. The method of claim 6, wherein the maximum number of dummy bits and the maximum number of existing bits are different.

9. The method of claim 1, wherein the error is a thermal asperity caused by a magnetoresistive read element colliding with a particle proximate to the disk surface.

10. The method of claim 1, wherein determining the approximate location of the error includes reading a region of the disk surface a first time to provide first read data, reading the region of the disk surface a second time to provide second read data, and determining where the second read data begins to differ from the first read data.

11. A method of correcting a read error in a disk drive, comprising:

reading a disk surface to provide a scrambled data signal that includes scrambled data bits and scrambled error correction code (ECC) bits;

(a) detecting an error in the scrambled data signal;

(b) determining an approximate location of the error;

(c) descrambling the scrambled data signal;

(d) performing an error correction procedure on the descrambled data bits using the descrambled ECC bits and the approximate location of the error; and if the error correction procedure is not successful, then (e) rescrambling the descrambled data signal;

(f) defining the rescrambled data signal as a first portion followed by a second portion with a boundary therebetween corresponding to the approximate location;

(g) descrambling the first portion of the rescrambled data signal;

(h) shifting the second portion of the rescrambled data signal;

(i) descrambling the shifted second portion of the rescrambled data signal;

(j) concatenating the descrambled first portion of the rescrambled data signal with the descrambled shifted second portion of the rescrambled data signal to provide a concatenated data signal; and (k) repeating the error correction procedure on the concatenated data signal.

12. The method of claim 11, wherein shifting the second portion of the rescrambled data signal includes inserting a dummy bit into the second portion of the rescrambled data signal at the approximate location of the error.

13. The method of claim 12, including rescrambling the descrambled shifted second portion of the rescrambled data signal to provide the second portion of the rescrambled data signal and then repeating steps (h) through (k) unless the error correction procedure in step (k) was successful or a maximum number of dummy bits have been shifted into the second portion of the rescrambled data signal.

14. The method of claim 11, wherein shifting the second portion of the rescrambled data signal includes removing an existing bit from the second portion of the rescrambled data signal at the approximate location of the error.

15. The method of claim 14, including rescrambling the descrambled shifted second portion of the rescrambled data signal to provide the second portion of the rescrambled data signal and then repeating steps (h) through (k) unless the error correction procedure in step (k) was successful or a maximum number of existing bits have been removed from the second portion of the rescrambled data signal.

16. The method of claim 11, including:

repeating steps (h) through (k), wherein step (h) includes inserting a dummy bit into the second portion of the rescrambled data signal at the approximate location of the error, unless the error correction procedure was successful or a maximum number of dummy bits have been inserted into the second portion of the rescrambled data; and if the error correction procedure was not successful and the maximum number of dummy bits have been inserted into the second portion of the rescrambled data, then removing the dummy bits from the second portion of the rescrambled data; then repeating steps (h) through (k), wherein step (h) includes removing an existing bit from the second portion of the rescrambled data signal at the approximate location of the error unless the error correction procedure was successful or a maximum number of existing bits have been removed from the data signal.

17. The method of claim 16, wherein the maximum number of dummy bits and the maximum number of existing bits are identical.

18. The method of claim 16, wherein the maximum number of dummy bits and the maximum number of existing bits are different.

19. The method of claim 11, wherein the error is a thermal asperity caused by a magnetoresistive read element colliding with a particle proximate to the disk surface.

20. The method of claim 11, wherein determining the approximate location of the error includes reading a region of the disk surface a first time to provide first read data, reading the region of the disk surface a second time to provide second read data, and determining where the second read data begins to differ from the first read data.

* * * * *